June 21, 1960 R. C. RICE ET AL 2,941,759
HEAT EXCHANGER CONSTRUCTION
Filed Jan. 14, 1957

INVENTORS
ROBERT C. RICE &
EDWARD W. SCHWARTZ
BY
ATTORNEY

United States Patent Office 2,941,759
Patented June 21, 1960

2,941,759

HEAT EXCHANGER CONSTRUCTION

Robert C. Rice, La Jolla, and Edward W. Schwartz, San Diego, Calif., assignors to General Dynamics Corporation, San Diego, Calif., a corporation of Delaware Filed Jan. 14, 1957, Ser. No. 633,920

5 Claims. (Cl. 244—117)

The present invention relates to heat exchangers and more particularly to a heat exchanger having a novel porous wall construction adapted to be readily cooled to afford a stabilized heat transfer condition throughout its area.

This invention finds particular application in the field of aircraft and missiles which travel at supersonic speeds and it serves to prevent damage to structure thereof from heat engendered by movement of the airplane or missile through the air. Elevated skin temperatures resulting from travel at high speeds can be tolerated if they endure for only relatively short time intervals and will not adversely affect the structural integrity of the airplane or missile. It is for conditions of prolonged continuance of elevated temperatures that compensation must be made to prevent possibly disastrous effects. Accordingly, to the end of avoiding the possible destructive effects of sustained elevated temperatures the porous wall type heat exchanger of the present invention is provided. Typical areas of an airplane or missile necessitating the use of a porous wall heat exchanger include the leading edge skins of wings, rudders, horizontal stabilizers, nose structures and the like. It is well known that at sustained very high speeds the heat generated by the friction of the surrounding air in contact with moving bodies can reach a level which may have deleterious effects thereon, in fact, a heat condition may be encountered which may even have the capacity to destroy the moving body. Other than possibly materially reducing or destroying the strength of a skin and adjacent structure equipment within the aircraft or missile may be effected such as the electronic equipment may become overheated and malfunction by reason thereof or further an intensely discomforting heated environment may be afforded the pilot in control of the airplane.

It is a primary object of the present invention to provide an improved form of heat exchange structure particularly adapted for use in moving bodies travelling at high speeds to avoid the effects of high heat generated by air friction.

Another object of this invention is to provide a heat exchanger construction having porous walls and embodying heat transfer stabilizing means whereby temperature uniformity is maintained over the entire wall area.

Another object of this invention is to provide a porous wall heat exchanger utilizing a coolant fluid for heat transfer purposes, the heat exchanger having a construction whereby the coolant fluid is uniformly distributed.

Another object of this invention is to provide in a heat exchanger of the character above a construction wherein the flow of coolant fluid may be controlled and, if desired, completely dammed in selected areas.

Another object of this invention is to provide a porous wall heat exchanger employing a coolant fluid and having a construction which serves to prevent heat transfer to the fluid supply source thereby avoiding heating of the coolant fluid prior to its introduction to areas required to be cooled.

Another object of this invention is to provide a porous wall heat exchanger so constructed as to uniformly meter the flow of coolant fluid being dispersed therefrom.

Another object of the invention is to provide a heat exchanger embodying a porous wall which is characterized by its simplicity of construction, its efficiency and its economy.

Other objects and features of the present invention will be readily apparent to those skilled in the art from the following specification and appended drawings wherein is illustrated a preferred form of the invention, and in which.

Figure 1:
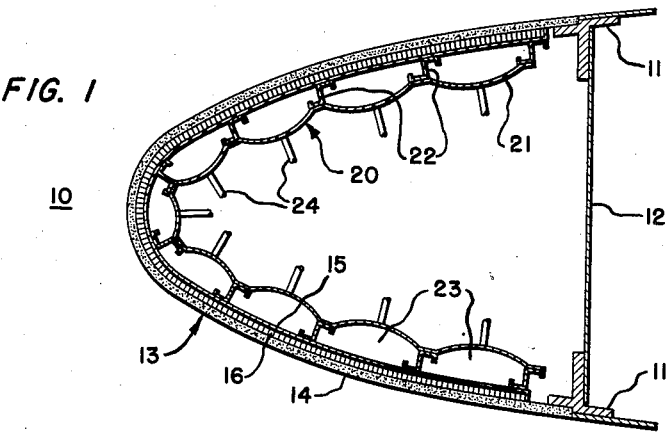
Figure 1 is a sectional view of a leading edge or nose portion of an aircraft wing embodying the present invention.

Referring now in detail to the drawings and particularly to Figure 1 wherein is illustrated the leading edge or nose portion of an aircraft wing, which leading edge is indicated generally by the numeral 10 and embodies a construction, in accordance with the present invention, which makes it a heat exchanger unit. The heat exchanger construction, afforded leading edge 10, is adapted for use on various surfaces of aircraft or missiles which in moving through air at high speeds are likely to be heated to a high degree in overcoming the resistance presented by the air. For instance, such surfaces, in addition to the leading edge of a wing, may be the forward or nose portion of a missile, or the forward portion of a vertical or horizontal stabilizer, or the forward portion of any airplane or missile surface which in the movement of the airplane or missile encounters the full resistance of the air and by reason thereof becomes subject to high frictional heat. Exemplary of such surfaces is the wing nose or leading edge portion 10 shown in Figure 1. It is understood that this surface has been selected for description merely for the purpose of simplifying the disclosure of the present invention.

Wing nose or leading edge portion 10, as shown, is generally U-shape in cross-section and is affixed at its extremities to usual vertically spaced, front, longitudinally extending spar members 11. Spar members 11, as illustrated, are interconnected by a usual spar plate 12 and form a part of the inner strengthening framework of the after portion of a wing. This wing framework, it is understood, is of conventional construction and may be formed of usual, chord-wise disposed, cross-rib members and usual longitudinally extending interconnecting stringers. Since this framework of cross-ribs and stringers is conventional and its particular construction does not form a part of the present invention a showing thereof has not been made in the drawings. For purposes of explaining the present invention it is necessary only to show the leading edge portion of a wing, since the remainder of the wing, it is assumed, may be of any conventional construction.

Figure 2:
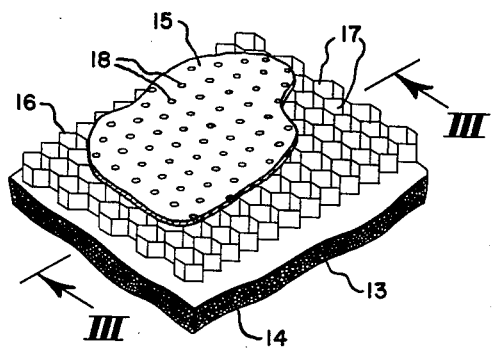
Figure 2 is an enlarged partial perspective view of a porous wall heat exchanger construction, in accordance with the present invention, employed in the leading edge of Figure 1.
Figure 3:
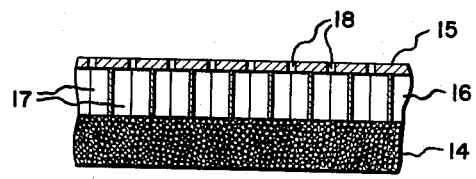
Figure 3 is a sectional view taken along the line III—III of Figure 2.

Leading edge or nose portion 10, as shown, in Figure 1, is transversely rounded or curved in an airfoil contour for aerodynamic purposes and, in accordance with the present invention, is provided with a defining wall assembly 13 having a construction which effects a heat exchanger unit. Wall assembly 13, as best shown in Figure 2, comprises an outer porous or sintered sheet metal skin 14, an inner metallic sheet 15, and a cellular core 16 which separates skin 14 and sheet 15.

The porous metallic sheet material of which skin 14 is formed may be any conventional metal having minute pores suitable for passage of a fluid medium therethrough. Porous stainless steel is a preferred material for skin 14 since it possesses many properties particularly desirable for aircraft use, including high strength and good corrosion resistance. Stainless steel is made into porous sheet form by processes conventional in the art of powder metallurgy. As is well known, in the manufacture of a porous sheet, the pores are generally formed by mixing a volatile substance such as salicyclic acid or stearine with a powdered metal such as stainless steel powder and uniformly blending and sintering the mass. During sintering the volatile substance forms a gas which in escaping forms a multiplicity of pores of the continuous type, which pores serve as the passages for the flow of fluid from one side to the other of the porous sheet. Variation in the rate at which fluid may be passed may be obtained by varying the degree of porosity and size of the pores. A desired porosity for a sheet is readily obtainable by the use of particles of powder of proper size and shape. Skin 14 in addition to being made of stainless steel may be made of other suitable metals such as nickel, copper-tin-nickel, copper-antimony-nickel, or copper nickel. It is understood, of course, that the present invention is not concerned with the particular process or technique employed for effecting a porous metal sheet since this invention contemplates the use of any suitable porous metal skin irrespective of the manner in which it is formed.

Cellular core 16 which separates porous skin 14 and inner sheet 15 serves as a fluid conductor to provide fluid under pressure at defined, localized areas of the skin 14. It may be formed of wells of any suitable foil material, such as aluminum foil, disposed and suitably secured together in the form of a honeycomb or grating to effect a plurality of individual cells or regularly subdivided hollow spaces 17. These cells or spaces may assume a hexagonal shape as shown or may be fabricated in any other suitable form or geometric pattern, which will serve to form a plurality of cells or hollow spaces isolated from each other. These cells serve as separate channels for applying the coolant transversely or radially to the inner surface of skin 14 in separate local areas. The particular manner of manufacturing cellular core 16 is, of course, not a part of the present invention. Cellular core 16 is secured at one face to the inner surface of skin 14 in any conventional manner, as by cementing with a thermosetting adhesive, brazing or by sintering. Also if desired, cellular core 16 may be embedded in the metallic mass of skin 14 during the sintering thereof and thereby be adhered in the same operation.

To complete the wall assembly 13 and effect a heat exchanger of sandwich construction metal sheet 15 is disposed at the opposite face of cellular core 16 and may be secured in place similarly to skin 14, as by means of a thermosetting adhesive, brazing or sintering. Metal sheet 15 is provided with a multiplicity of orifices or apertures 18 to provide communication from the exterior of sheet 15 with each of the individual cells 17 of cellular core 16. Orifices 18, as required, may vary in size throughout sheet 15, or the number of orifices placed in communication with particular individual cells may be increased, to provide proper metering of a coolant fluid to each particular area of the heat exchanger unit to accommodate the heat condition there prevalent. Also to obtain proper distribution of coolant fluid the dimensions of cells 17 of core 16 may be varied in accordance with the desired metering flow rate.

The consideration which establishes the need for variations in size and/or quantity of orifices 18 and cells 17 will now be discussed. As hereinbefore stated, a heat exchanger construction as described is well adapted for use in an airfoil structure such as at the leading edge or nose portion of an airplane wing. With the airplane in flight the air which impinges on the forward portion of the leading edge of the wing creates a pressure condition there which is of high order. This pressure, however, rapidly drops off in the rearward upper and lower surface areas over which the air flows. Correspondingly, air friction is greatest in the high pressure areas and therefore will elevate the temperature of the leading edge the highest, decreasing the heat generated at the rearward areas proportionately to the pressure drop of the air flowing rearwardly along the wing surfaces. At supersonic speeds, the heat generated at the leading edge may reach a very dangerous level. Thus from the foregoing, it is apparent that areas of high pressure are similarly areas of elevated temperatures and accordingly the problem of cooling is greater in high pressure areas than in adjacent areas of lower pressure.

An effective heat exchanger means for compensating for the heat developed at the nose of a wing requires, in addition to the porous or sintered metal skin 14, means for positively and properly conducting a coolant medium to the skin 14 for flow therethrough. It is apparent that localized areas of high pressure and accompanying elevated temperatures require a greater coolant flow to effect proper temperature control. Knowing from calculations and various tests, the heat which may be expected at various areas of the wing leading edge, it can be determined what amount of coolant is necessary at such various areas and in constructing the wing an appropriate number and/or size of orifices 18 and cells 17 are provided to assure the proper coolant flow rate to those areas of elevated temperatures which require protection.

Referring again to Figure 1 there is illustrated a typical arrangement for supplying coolant fluid to the leading edge 10, whose construction, as explained, makes leading edge 10 a heat exchanger unit. This supply arrangement is indicated in the drawings generally by the numeral 20 and comprises a metallic sheet 21 disposed in spaced relation to inner metal sheet 15 and held separated therefrom by a plurality of longitudinally Z-shaped stringers 22. Stringers 22 are secured at their opposite legs to metallic sheet 21 and sheet 15 in any suitable manner, such as by an adhesive, or brazing, or sintering. The legs of stringers 22 which are secured to sheet 15 may be punched or otherwise provided with through openings along their lengths so that only a minimum of surface of sheet 15 is sealed off. Since stringers 22 are not required for strengthening of leading edge 10 only a minimum amount of material is required in the legs applied to the surface of sheet 15. Stringers 22 are disposed on sheet 15 in transverse, spaced apart, parallel relationship and with sheets 15 and 21 form a plurality of parallel, spanwise extending passageways 23. Associated with passageways 23 are a plurality of conduits 24 which serve to bring the coolant fluid to the passageways 23 for flow therewithin. It is understood that usual pumps (not shown) may be provided to force the coolant fluid into passageways 23 and that any convenient reservoir may be employed for storage of the coolant fluid. The fluid employed for purposes of cooling the present structure may be water or any other suitable coolant fluid. It is understood that the fluid supply arrangement above described is merely exemplary of a means for providing fluid to the leading edge 10. The present invention contemplates that any other suitable arrangements may be used to conduct coolant fluid to the leading edge 10.

In operation, when such speeds of flight are attained that it becomes necessary to cool the leading edge 10 a suitable thermostatic or temperature responsive control device will effect actuation of the pumps or other force devices which brings the coolant fluid under required pressure to the passageways 23 and thereafter forces it through the openings of sheet 15, then through cellular core 16 and thereafter through porous wall 14 to exit into the surrounding airstream to accomplish the desired cooling.

Though the fluid supplied at the highly heated areas of the exterior surface of skin 14 will boil at the temperatures there developed by the friction of the air it has been found that there is no boiling of the fluid inwardly of skin 14 since the cushion of fluid supplied at the rearward surface of skin 14 readily absorbs such heat as is rearwardly transmitted through skin 14 and no boiling occurs either at this fluid cushion or in the conduits supplying the fluid.

Figure 4:
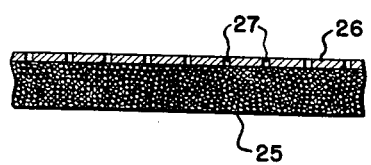
Figure 4 is a sectional view of a modified form of porous wall heat exchanger.

Figure 4 illustrates a modified form of heat exchanger construction which may be employed in areas of airfoil or missile surfaces subject to high heat conditions. This construction comprises a porous wall or sintered metal skin 25, similar to skin 14 of the first embodiment, and a metal sheet 26, similar to sheet 15 above, having a multiplicity of orifices 27 therethrough. Metal sheet 26 is secured to skin 25 in any suitable manner, as by adhesive bonding, brazing or sintering. Coolant fluid is conducted under pressure to perforated sheet 26 by any suitable supply means to be passed through the orifices 27 thereof and thence through the pores of skin 25 to exit into the surrounding airstream. Similarly as in the case of skin 14 skin 25 is provided with orifices which are appropriate in number, size and spacing to effect cooling at the surface of skin 25. Thus in this second embodiment the cellular core which is present in the first embodiment is here lacking. This second embodiment though not usable for as high temperature situations as the first embodiment may find use where it is known that the speed of the airplane or missile will not be so great as to develop the extremely high heat conditions which may best be served by use of the first embodiment.

Figure 5:
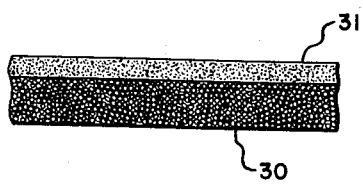
Figure 5 is a sectional view of another modification of a porous wall heat exchanger.

In Figure 5 there is illustrated a further modification of the invention. Here the heat exchanger construction comprises an outer porous wall or sintered metal skin 30, again similar to skin 14 of the first embodiment, to the inner surface of which is suitably bonded fluid metering coating 31. Coating 31 is formed of a large mass of uniformly sized spheres of a material such as metal, glass or other suitable heat resistant material. These spheres are bonded together at their areas of contact with a suitable adhesive to form minute and uniformly sized pores through the coating. Coating 31 passes the coolant fluid, which is brought under pressure to it by any conventional pumping and conduit arrangement, to the pores of skin 30, which fluid passes through skin 30 and into the airstream to perform its cooling purpose. Metering coating 31 provides for a uniform distribution of coolant fluid to skin 30 throughout required areas thereof to assure cooling of its outer surface. Coating 31 may be applied in different densities or thicknesses at different areas of the skin 30 to effect a denser or heavier coating in those particular areas where the heat conditions require differences in the metering of the fluid supplied in order to compensate therefor.

By supplying backing fluid conducting layers to the outer porous metal skins 14, 25 and 30 as has been described in the three embodiments above described proper flow of fluid to the entire outer surface of these skins is assured. If fluid were attempted to be forced directly through the skins such fluid, it has been found, would exit unequally at the exterior surface and various areas would not receive the required amount of coolant to compensate for the heat condition there prevalent. The nature of a porous metal skin is responsible for this condition since the pores thereof are not uniform but will vary in size, shape and pattern. Because of this non-uniformity the fluid supplied will concentrate in the areas adjacent the larger pores while relatively small amounts will course through the more restricted pores. Further, it has been found that a condition known as "channeling" may occur within the porous skin itself. In such instance, the fluid flows laterally, instead of through, taking paths of lesser resistance until an adequate through passage which may be far spaced from the point of entrance of the fluid is encountered which will allow the fluid to course forwardly. However, with the use of backing fluid conducting layers for the porous skin wherein, in effect, a separate supply of fluid under pressure may be metered to separate areas of the skin defined by the backing fluid conducting layer, it has been found that a proper distribution and quantity of fluid is obtained at the exterior surface of the skin and at all areas which require protection.

While certain preferred embodiments of the invention have been specifically disclosed it is understood that the invention is not limited thereto as many variations will be readily apparent to those skilled in the art and the invention is to be given its broadest possible interpretation within the terms of the following claims.

What we claim is:

1. An aeronautical heat exchanger forming the leading edge of a structure of airfoil contour comprising an outer porous wall formed of a sheet of porous metal and subject to being heated by the friction of air flowing thereover, and inner wall means positioned adjacent the entire area of the inner surface of said porous wall, said inner wall means comprising a honeycomb structure and a sheet metal wall adjacent the honeycomb structure and spaced from said porous wall by said honeycomb structure, said honeycomb structure having the cell walls of each of the individual cells thereof engaged with said porous wall to conduct coolant fluid to said porous wall at localized and separate areas thereof, said spaced sheet metal wall having openings therethrough for passage of said coolant fluid to said cells.

2. An aeronautical heat exchanger forming the leading edge of a structure of airfoil contour comprising an outer porous wall formed of a sheet of porous metal and subject to being heated by the friction of air flowing thereover, an inner sheet metal wall, and a cellular core structure substantially coterminous and in abutting relationship over the entire area with said porous wall and said inner wall said cellular core structure spacing said inner wall from said porous wall and secured at its opposite faces to both of said walls, said cellular core structure being formed of a plurality of fluid conducting cells in arranged relationship and having the cell walls of each of the individual cells thereof engaged with said porous wall for directing coolant fluid under pressure transversely to the inner surface of said porous wall at localized, separate areas thereof, said inner sheet metal wall having openings therethrough communicating with said cells for passage of said coolant fluid to said cells.

3. An aeronautical heat exchanger forming the leading edge of a structure of airfoil contour comprising an outer porous wall formed of a sheet of porous metal and subject to being heated by the friction of air flowing thereover, a planar inner metal wall, a cellular core structure substantially coterminous and adjacent over its entire area with said porous wall and said inner wall spacing said inner wall from said porous wall and secured at its opposite faces to said walls, said cellular core structure being formed of a plurality of fluid conducting cells in arranged relationship, and having the cell walls of each of the individual cells thereof engaged with said porous wall for directing coolant water transversely to the inner surface of said porous wall at localized, separate areas thereof, said inner sheet metal wall having through openings communicating with asid cells, and a plurality of spancommunicating with said cells, and a plurality of spanwise extending fluid passageways in juxtaposed relation on the interior surface of said inner wall for supplying water under pressure to said through openings of said inner wall.

4. An aeronautical heat exchanger forming the leading edge of a structure of airfoil contour comprising an outer porous wall formed of a sheet of porous metal and subject to being heated by the friction of air flowing thereover, a honeycomb structure substantially coterminous and adjacent over its entire area with said porous wall and secured thereto, said honeycomb structure being formed of a plurality of fluid conducting cells in arranged relationship and having the cell walls of each of the individual cells thereof engaged with said porous wall for directing coolant fluid under pressure for passage through said porous wall, and fluid conducting means communicating with said cells for passage of said coolant fluid to said cells.

5. An aeronautical heat exchanger construction comprising an outer porous wall adapted to be heated by friction of the air flowing thereover a cellular core structure positioned adjacent the entire area of said porous wall, said cellular core having the cell walls of each of the individual cells thereof engaged with said porous wall, and inner wall means abutting the entire area of the inner surface of said cellular core structure and having a construction adapted to receive a coolant fluid for metered distribution to said porous wall within each of the areas defined by said cellular core structure for passage therethrough to the exterior thereof.

References Cited in the file of this patent

UNITED STATES PATENTS

| | | |
|---|---|---|
| 2,249,940 | Bulloch | July 22, 1941 |
| 2,372,581 | Jones | Mar. 27, 1945 |
| 2,468,820 | Goddard | May 3, 1949 |
| 2,742,247 | Lachmann | Apr. 17, 1956 |